June 28, 1932. O. F. CARPENTER Re. 18,505

ATTACHMENT FOR NAILING MACHINES

Original Filed Nov. 18, 1930 4 Sheets-Sheet 1

Inventor

Ose F. Carpenter

By Geo. P. Kimmel

Attorney

June 28, 1932. O. F. CARPENTER Re. 18,505

ATTACHMENT FOR NAILING MACHINES

Original Filed Nov. 18, 1930 4 Sheets-Sheet 2

Inventor

Ose F. Carpenter

By Geo. P. Kimmel

Attorney

June 28, 1932. O. F. CARPENTER Re. 18,505

ATTACHMENT FOR NAILING MACHINES

Original Filed Nov. 18, 1930 4 Sheets-Sheet 3

Inventor
Ose F. Carpenter

By Geo. P. Kimmel
Attorney

June 28, 1932. O. F. CARPENTER Re. 18,505

ATTACHMENT FOR NAILING MACHINES

Original Filed Nov. 18, 1930 4 Sheets-Sheet 4

Inventor
Ose F. Carpenter

By Geo. P. Kimmel
Attorney

Reissued June 28, 1932

Re. 18,505

UNITED STATES PATENT OFFICE

OSE F. CARPENTER, OF BRIGHTWOOD, VIRGINIA

ATTACHMENT FOR NAILING MACHINES

Original No. 1,834,827, dated December 1, 1931, Serial No. 496,485, filed November 18, 1930. Application for reissue filed April 2, 1932. Serial No. 602,841.

This invention relates to an attachment for nailing machines and has for its primary object to provide, in a manner as hereinafter set forth, an attachment of such class by means of which a nailing machine may be utilized to nail and clinch the walls of a chicken coop with the rods or slats of the coop in position.

A further object of the invention is to provide an attachment of the character aforesaid which includes adjustable means for supporting the parts being nailed, and which further includes adjustable means for clinching the nails, thereby adapting the machine for use in nailing and clinching the walls of a chicken coop having their rods or slats spaced varying distances apart.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views.

Figure 1:
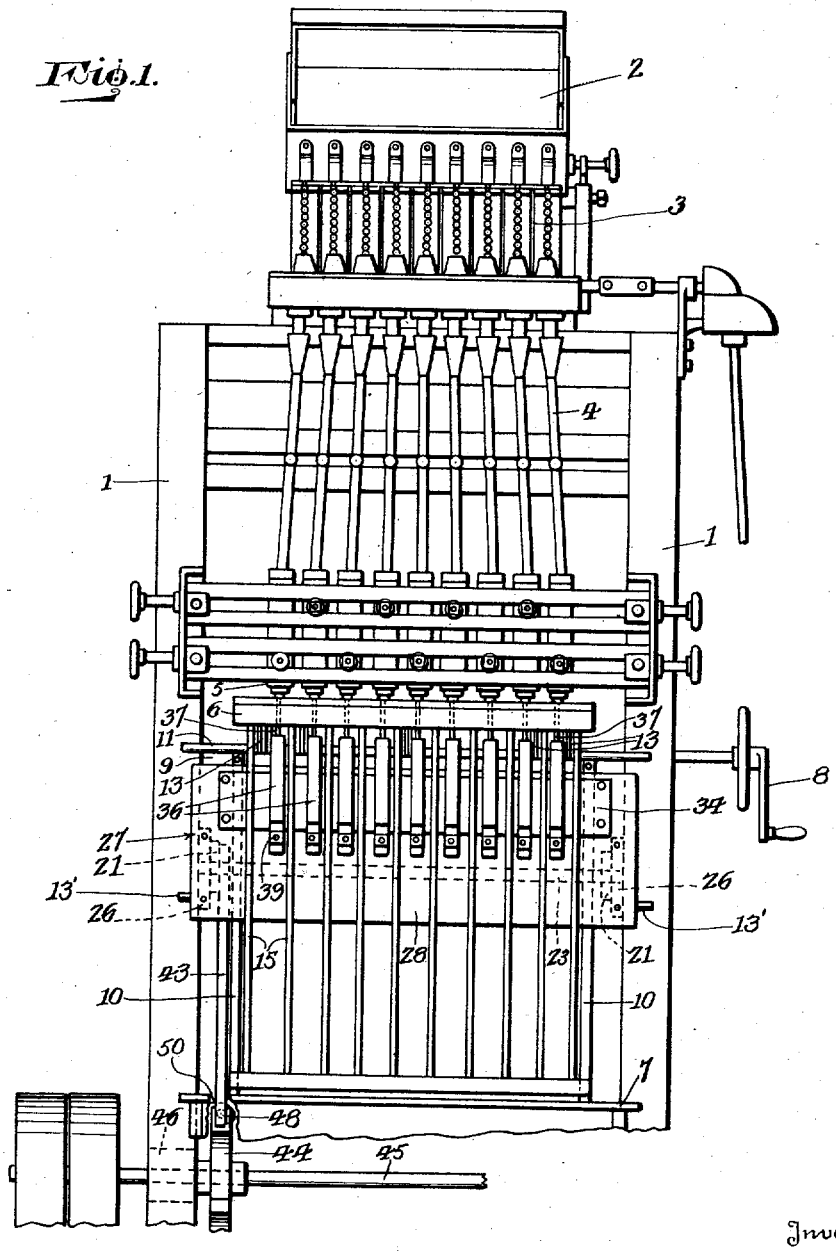
Figure 1 is a front elevation of a nailing machine equipped with my attachment.
Figures 2, 11, 12:
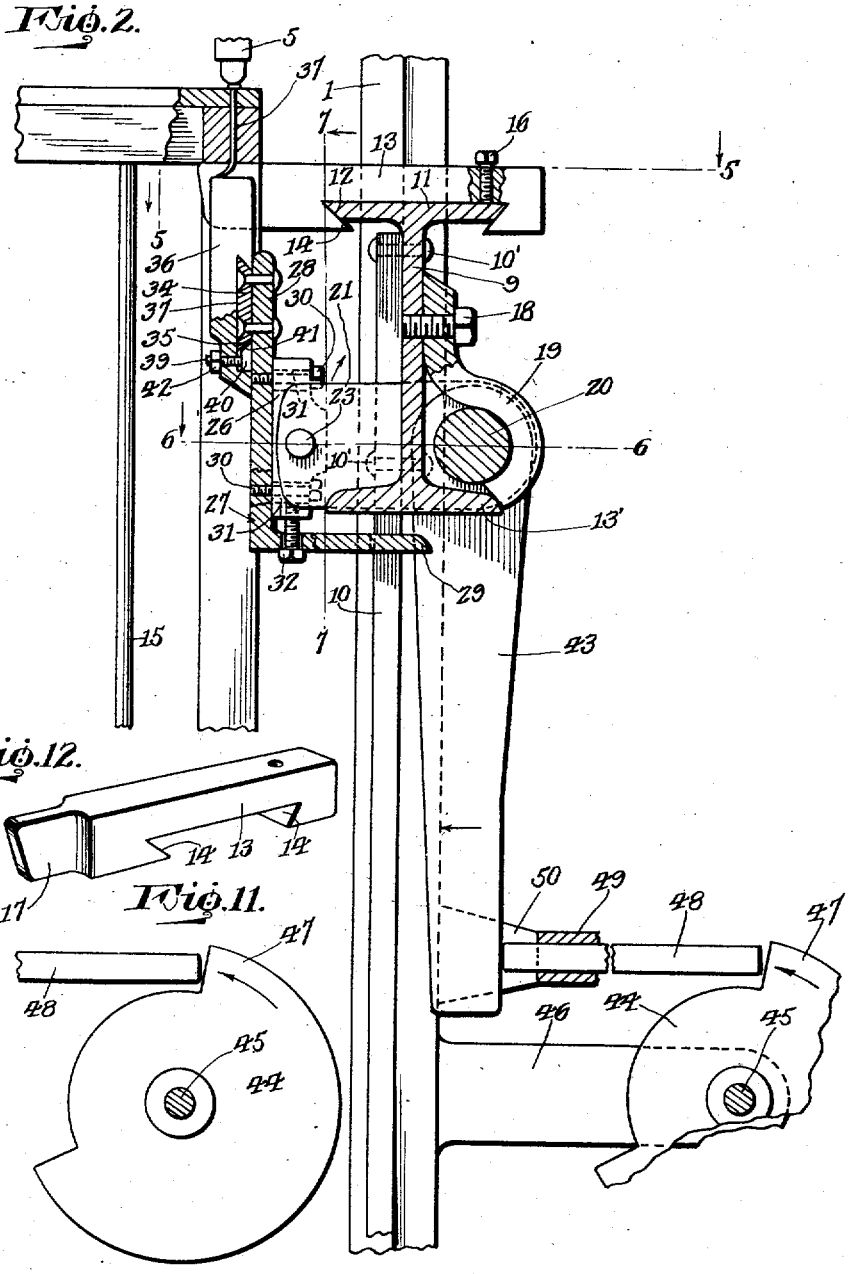
Figure 2 is an enlarged vertical section therethrough.
Figure 11 is a fragmentary sectional elevation showing the cam and push rod for operating the clincher bars.
Figure 12 is an enlarged perspective view of one of the adjustable supports for the work.
Figure 3:
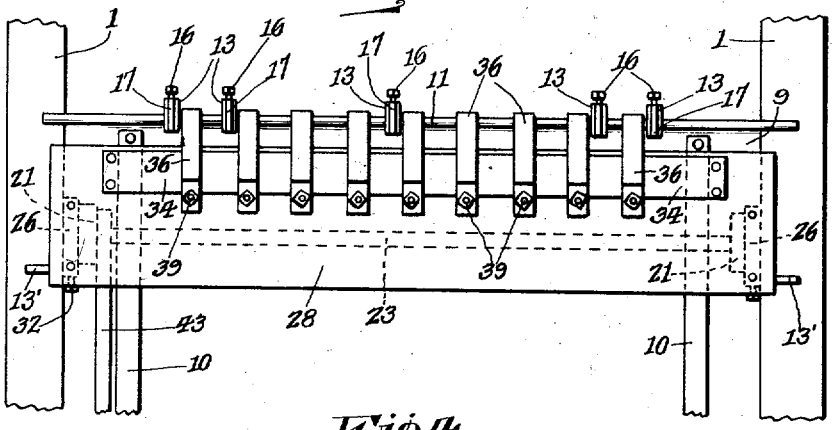
Figure 3 is an enlarged fragmentary view showing the attachment in front elevation.
Figure 4:
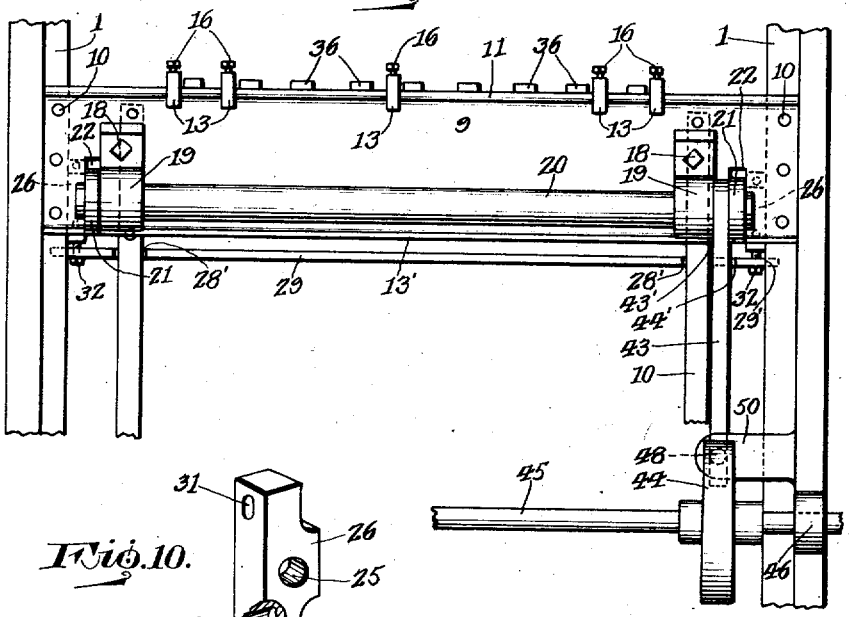
Figure 4 is a similar view showing the attachment in rear elevation.
Figure 10:
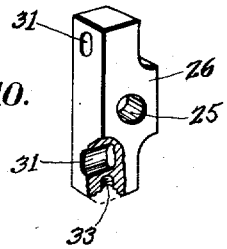
Figure 10 is an enlarged perspective view of one of the adjustable supports for the plate carrying the clincher bars.
Figure 5:
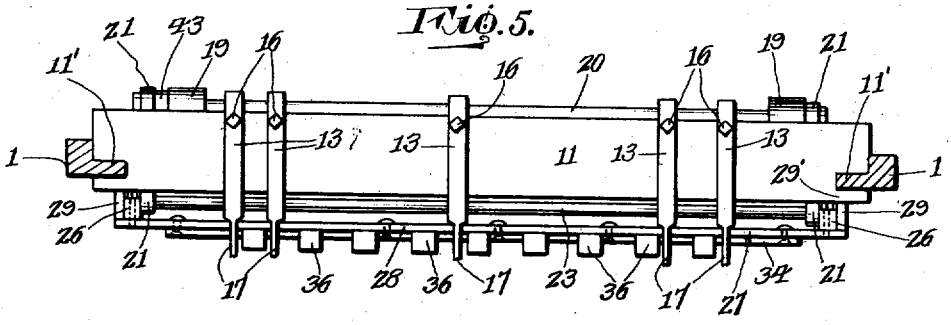
Figure 5 is a sectional plan taken at a point indicated by the line 5—5 of Figure 2.
Figure 6:
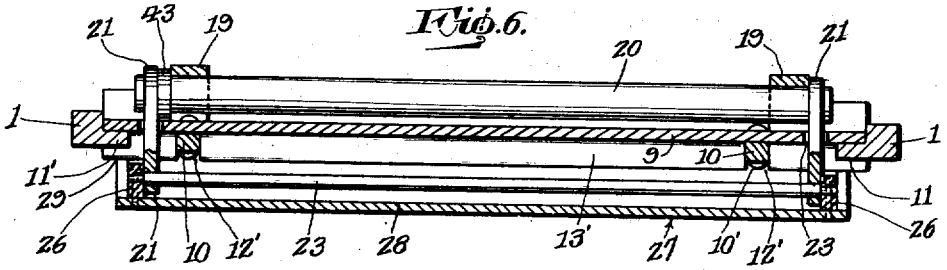
Figure 6 is a sectional plan taken at a point indicated by the line 6—6 of Figure 2.
Figure 7:
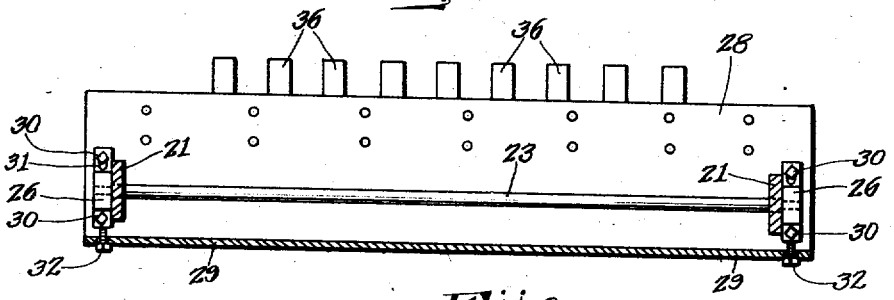
Figure 7 is a sectional elevation taken at a point indicated by the line 7—7 of Figure 2.
Figure 8:
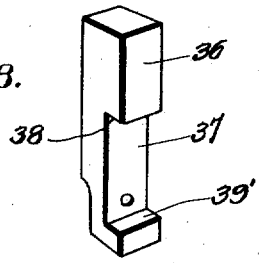
Figure 8 is an enlarged perspective view of one of the clincher bars.
Figure 9:
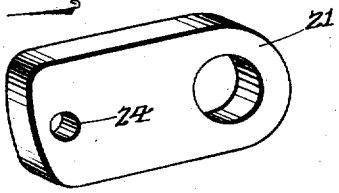
Figure 9 is an enlarged perspective view of one of the rocker arms for elevating the clincher bars.

Referring to the drawings in detail, the numeral 1 indicates a pair of side frame members of the nailing machine, said frame members being of angle iron construction. The nailing machine as shown includes a nail receiving receptacle 2, from which nails are fed by a feeding means 3 and conducted through guide means 4 to the nail driving chuck 5, by means of which the nails are driven into the work indicated at 6. The nail driving chucks 5 are slidably mounted transversely of the machine in order that the same may be positioned to drive the nails at any distance apart desired. The foregoing elements are of well known construction and form no part of the present invention. The machine as shown also includes a work supporting table 7 which is vertically adjustable by means of a crank 8.

My attachment includes a rigid support 9 which is preferably of I-beam construction and which extends transversely of the machine and is secured to a pair of rigid supporting members 10 by suitable holdfast devices 10′. The upper and lower flanges of the support 9 are notched as indicated at 11′ to slidably receive the frame members 1. The bars 10 extend vertically through slots 12′ in the lower flange 13′ of the support 9, and are rigidly secured at their lower ends to the table 7. The upper flange 11 of the support 9 is formed with beveled edges 12 in order that a plurality of work supporting members 13 may be mounted on the flange 11 to permit movement of the members 13 longitudinally of the support 9, and to prevent movement of the supporting members 13 transversely of the support 9. Each of the supporting members 13 is of elongated construction disposed transversely of the flange 11, and is formed in its lower face with a recess 14 within which the flange 11 is received. The supporting members 13 may be properly adjusted lengthwise of the support 9 to provide for the projection of the forward ends of the supports 13 between the slats 15 of the coop being nailed, and may be prevented from being moved from their set positions by means of set screws 16 which are threaded vertically through the supporting members 13 and bear against the upper face of the flange 11. The forward ends of the supporting members 13 are materially reduced in width as indicated at 17 in order that the same may be extended between slats, such as 15 which are positioned relatively close together.

Secured to the rearward face of the support 9, by means of suitable holdfast devices 18, are a pair of curved bearing brackets 19 which support a rocker shaft 20 extending transversely of the machine. Fixedly secured to the rocker shaft 20 are a pair of rocker arms 21 which extend forwardly through a pair of slots 22 formed in the support 9 and opening through the lower face thereof. The rocker arms 21 have their forward ends pivotally connected with a rod 23 which extends through openings 24 in the arms 21, and which further extends through openings 25 in a pair of blocks 26 adjustably supporting a plate 27. The plate 27 is of elongated formation extending transversely of the machine and includes a vertically disposed portion 28 and a rearwardly projecting, horizontally disposed portion 29. Threaded into the portion 28 and projecting rearwardly therefrom are a plurality of binding screws 30. The binding screws 30 are arranged in pairs with the screws of each pair arranged in vertical alignment. Each pair of the screws 30 loosely extend through a pair of elongated slots 31 formed in a block 26 adjacent the ends of the block and disposed vertically thereof. Loosely rotatable through the horizontal portion 29 of the plate 27 are a pair of adjusting screws 32 which are threaded into openings 33 in the lower faces of the blocks 26. By manipulation of the adjusting screws 32, the plate 27 may be raised or lowered with respect to the blocks 26, and the blocks 26 then may be rigidly secured to the vertical portion 28 by tightening the binding screws 30. The rearward corners of the portion 29 are recessed as indicated at 29′ to receive the portions of the frame members 1 which project inwardly of the side edge of the plate 27. The portion 29 is formed in its rear edge with recesses 28′ for the passage therethrough of the bars 10.

Rigidly secured to the forward face of the portion 28 is a supporting bar 34 which extends transversely of the machine and is formed with beveled upper and lower edges as indicated at 35. Slidably mounted on the bar 34 are a plurality of vertically disposed clincher bars 36 for abutment with the nails 37 to clinch the latter upon an upward movement of the plate 27. Each of the clincher bars 36 is formed in its rearward face with a recess 37 having a beveled upper edge 38 and further having a horizontally disposed lower edge 39′. The clincher bars 36 are mounted on the bar 34 with the latter extending through the recesses 37, and the clincher bars 36 are maintained in position on the bar 34 by means of a plurality of securing bolts 39, one of which is provided for each of the clincher bars. Each securing bolt 39 is provided with a head 40 having a horizontally disposed lower face seated on the lower wall 39′ of a recess 37, the head 40 further having a beveled upper face 41 for abutment with the beveled lower face 35 of the bar 34. By loosening the nuts 42 of the securing bolts 39, the clincher bars 36 may be moved longitudinally of the bar 34, and when the clincher bars are properly arranged with respect to the nails 37, the bars may be secured against displacement by tightening the nuts 42 which draws the heads 40 of the bolts 39 into engagement with the beveled lower face 35 of the bar 34.

The means for moving the clincher bars into engagement with the nails includes a lever 43, the upper end of which is fixedly mounted on the rocker shaft 20. The lever 43 extends downwardly through recesses 43′ and 44′ in the flange 13′ and portion 29 of the plate 27 respectively. The lever 43 is operated by means of a cam 44 mounted on a suitable shaft 45 carried by brackets 46 extending rearwardly from the frame member 1. Upon rotation of the cam 44, a peripherally projecting portion 47 thereof is brought into engagement with the rearward end of a push rod 48 which is slidably mounted in the bearing 49 of a bracket 50 projecting rearwardly from one of the frame members 1. Upon a longitudinal movement of the push rod 48 the forward end of the latter is brought into engagement with the rear face of the lever 43 whereby the shaft 20 is rotated which swings the rocker arms 21 in an arc to lift the plate 27, bar 34, and clincher bars 36.

In the use of the attachment, the height of the supporting members 13 is adjusted by means of the table adjusting means in accordance with the thickness of the parts to be nailed, and the supporting members 13 are adjusted longitudinally of the flange 11 in accordance with the distance between the slats of the coop being nailed, after which the parts of the coop to be nailed are seated on the forward end portions 17 of the supporting members 13 with the latter arranged between the depending slats of the coop.

The clincher bars 36 are first adjusted longitudinally of the bar 34, in accordance with the distance between the slats of the wall of the coop being nailed, so that the clincher bars 36 will be arranged in the desired position for nail clinching. The clincher bars 36, as well as the supporting member 13 are arranged between the depending slats of the wall of the coop. The supporting members 13 are positioned between certain of such slats at one side of certain of the clincher bars 36. After the bars 36 have been adjusted, the nail driving chucks 5 are positioned in vertical alignment with the clincher bars 36. It is necessary that the clincher bars 36 extend between slats of the coop being nailed in order to clinch the nails driven through the work and extending between the slats. Hence the necessity of adjusting the clincher bars 36 in accordance with the distance between the slats of the wall of the coop being nailed as the distance between the slats varies. The chucks, at the end of the nail driving operation thereof, act to prevent the work being acted upon from shifting off of the work supporting members during the nail clinching action by the bars 36, as such clinching action is carried out by the movement of the bars 36 towards the work through which the nails have been driven by the chucks, and as the latter are temporarily positioned directly over and against the work at the end of the nail driving operation, it necessarily follows that the chucks will prevent the acted upon work from being forced off of the work supporting members during the nail clinching operation.

It is thought that the many advantages of an attachment in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In an attachment for nailing machines, a rigid support adapted to be secured to the machine transversely thereof, a plurality of elongated work supporting members mounted on the support and extending transversely of the latter, a rocker shaft carried by the support, a rocker arm fixedly mounted on the rocker shaft and projecting forwardly therefrom, a block pivotally connected with the rocker arm, a supporting plate secured to the block, and extending transversely of the machine, a plurality of spaced clincher bars carried by said plate, and means for rocking the rocker shaft for elevating said clincher bars.

2. In an attachment for nailing machines, a rigid support adapted to be secured to the machine transversely thereof, a plurality of elongated work supporting members mounted on the support and extending transversely of the latter, a rocker shaft carried by the support, a rocker arm fixedly mounted on the rocker shaft and projecting forwardly therefrom, a block pivotally connected with the rocker arm, a supporting plate secured to the block and extending transversely of the machine, a plurality of spaced clincher bars carried by said plate, and means for rocking the rocker shaft for elevating said clincher bars, said work supporting members being adjustable longitudinally of the support therefor.

3. In an attachment for nailing machines, a rigid support adapted to be secured to the machine transversely thereof, a plurality of elongated work supporting members mounted on the support and extending transversely of the latter, a rocker shaft carried by the support, a rocker arm fixedly mounted on the rocker shaft and projecting forwardly therefrom, a block pivotally connected with the rocker arm, a supporting plate secured to the block and extending transversely of the machine, a plurality of spaced clincher bars carried by said plate, and means for rocking the rocker shaft for elevating said clincher bars, said clincher bars being adjustable longitudinally of the supporting plate therefor.

4. In an attachment for nailing machines, a rigid support adapted to be secured to the machine transversely thereof, a plurality of elongated work supporting members mounted on the support and extending transversely of the latter, a rocker shaft carried by the support, a rocker arm fixedly mounted on the rocker shaft and projecting forwardly therefrom, a block pivotally connected with the rocker arm, a supporting plate secured to the block and extending transversely of the machine, a plurality of spaced clincher bars carried by said plate, and means for rocking the rocker shaft for elevating said clincher bars, said supporting plate being vertically adjustable with respect to the block supporting the same.

5. In an attachment for nailing machines, a rigid support adapted to be secured to the machine transversely thereof, a plurality of elongated work supporting members mounted on the support and extending transversely of the latter, a rocker shaft carried by the support, a rocker arm fixedly mounted on the rocker shaft and projecting forwardly therefrom, a block pivotally connected with the rocker arm, a supporting plate secured to the block and extending transversely of the machine, a plurality of spaced clincher bars carried by said plate, a lever having one end fixedly secured to said rocker shaft, a slidable push rod for engagement with the lever adjacent the opposite end of the latter, and a rotatable cam for moving said push rod.

6. In an attachment for nailing machines, a rigid support adapted to be secured to the machine transversely thereof, said support being formed at its upper edge with a horizontally disposed flange having beveled edges, a plurality of elongated work supporting members formed in their lower faces with beveled recesses having said flange disposed therein, an adjusting screw threaded through each of said work supporting members for engagement with said flange, a rocker shaft carried by the support, a pair of rocker arms fixedly mounted on the rocker shaft and projecting forwardly therefrom, a pair of blocks pivotally connected with the rocker arms, a supporting plate secured to the blocks and extending transversely of the machine, a plurality of spaced clincher bars carried by said plate, and means for rocking the rocker shaft for elevating said clincher bars.

7. In an attachment for nailing machines, a rigid support adapted to be secured to the machine transversely thereof, a plurality of elongated work supporting members mounted on the support and extending transversely of the latter, a rocker shaft carried by the support, a pair of rocker arms fixedly mounted on the rocker shaft and projecting forwardly therefrom, a pair of supporting blocks pivotally connected with the rocker arms, a supporting plate having a vertically disposed portion slidably connected with said blocks and further having a horizontally disposed portion adjustably connected with said blocks, a plurality of spaced clincher bars carried by said supporting plate, and means for rocking the rocker shaft for elevating said clincher bars.

8. In an attachment for nailing machines, a rigid support adapted to be secured to the machine transversely thereof, a plurality of elongated work supporting members mounted on the support and extending transversely of the latter, a rocker shaft carried by the support, a pair of rocker arms fixedly mounted on the rocker shaft and projecting forwardly therefrom, a pair of blocks pivotally connected with the rocker arms, a supporting plate having a vertically disposed portion slidably connected with said blocks and further having a horizontally disposed portion adjustably connected with said blocks, a plurality of spaced clincher bars carried by said supporting plate, and means for rocking the rocker shaft for elevating said clincher bars, said work supporting members and clincher bars being adjustable transversely of the machine.

9. In an attachment for nailing machines, a rigid support adapted to be secured to the machine transversely thereof, a plurality of elongated work supporting members mounted on the support and extending transversely of the latter, a rocker shaft carried by the support, a pair of rocker arms fixedly mounted on the rocker shaft and projecting forwardly therefrom, a pair of blocks pivotally connected with the rocker arms, a supporting plate secured to the blocks and extending transversely of the machine, a supporting bar rigidly secured to the supporting plate and extending longitudinally of the latter, said supporting bar being formed with beveled upper and lower edges, a plurality of clincher bars slidably mounted on said supporting bar, each of said clincher bars having its rear face formed with a recess for the reception therein of the supporting bar, the upper wall of said recess being beveled for engagement with the upper beveled edge of the supporting bar, the lower wall of the recess being disposed horizontally and in spaced relation to the lower edge of the supporting bar, a securing bolt extending through each clincher bar, said bolt having its inner end formed with a head having a horizontal lower face seated against the lower wall of the recess in the clincher bar and having a beveled upper face for engagement with the beveled lower face of the supporting bar, and means for rocking the rocker shaft for elevating said clincher bars.

10. In a nailing machine attachment for clinching nails driven through adjacent walls of coops with the slats of said walls in position, a rigid support adapted to be secured to the machine transversely thereof, a plurality of spaced work supporting members mounted on the support for projection between certain of the slats of one wall, a plurality of spaced clincher bars positioned between the slats of the said one wall and further being aligned with respect to said work supporting members, and means for elevating said clincher bars to clinch the nails.

11. In an attachment for nailing machines, a rigid support adapted to be secured to the machine transversely thereof, work supporting means mounted on the support, a rocker shaft, a rocker arm operated by said rocker shaft, a block pivotally connected with the rocker arm, a supporting plate adjustably connected with said block and extending transversely of the machine, nail clinching means carried by said plate, and means for rocking the rocker shaft for elevating said nail clinching means.

12. In an attachment for a coop nailing machine, means for supporting the work to be acted upon, clincher bars arranged below the work supported upon said means and positioned between coop slats depending from the work, and nail driving chucks positioned over the work and arranged in alignment with the upper ends of said bars.

13. In an attachment for a coop nailing machine, adjustable means for supporting the work to be acted upon and extending between coop slats depending from the work, upstanding, adjustable clincher bars positioned between coop slats depending from the work, and nail driving chucks positioned over the work and in alignment with said bars.

14. In an attachment for coop nailing machines, means for supporting the work to be acted upon, adjustable clincher bars arranged below the work supported upon said means and positioned between coop slats depending from the work, and nail driving chucks positioned over the work and arranged in alignment with said bars.

15. In an attachment for coop nailing machines of that type including nail driving chucks, supporting means, and nail clincher bars mounted on said means and positioned between slats of the coops, said bars being adjustable lengthwise of said means to position them in vertical alignment with respect to the chucks to compensate for varying distances of the slats between which they extend.

16. In an attachment for coop nailing machines of that type including nail driving chucks, members arranged below the chucks for supporting the work to be operated upon, a supporting bar for said members, said members extending between coop slats depending from the work supported, said members being adjustable lengthwise of said bar to compensate for varying distances between such slats, a plate, and nail clincher bars mounted on said plate and positioned between slats of the coop depending from the work to be operated upon, said clincher bars being adjustable lengthwise of said plate to position them in vertical alignment with respect to the chucks and to compensate for varying distances between the slats between which they extend.

17. In an attachment for coop nailing machines, nail driving chucks, and nail clincher bars positioned below the chucks and between slats of the coop, said bars being adjustable to position them in vertical alignment below the chucks and to compensate for varying distances between the slats.

18. In an attachment for coop nailing machines, nail driving chucks, means for supporting the work to be operated upon below the chucks, and upstanding nail clincher bars positioned between slats of the coop depending from the work to be operated upon and in vertical alignment with respect to the chucks, said supporting means being interposed between the upper ends of said bars.

19. In an attachment for coop nailing machines of that type including nail driving chucks, a plate, a bar in spaced relation to the plate, work supporting means carried by the bar, and nail clincher bars carried by the plate extending between slats of the coop depending from the work supported by said means and in alignment with the chucks.

20. In an attachment for coop nailing machines of that type including nail driving chucks, a supporting plate, a supporting bar arranged in spaced relation to the plate, work supporting means carried by the bar, and upstanding nail clincher bars carried by the plate extending between slats of the coop depending from the work supported by said means to align with the chucks, said means interposed between the upper ends of the clincher bars and being adjustable upon said supporting bar, and said clincher bars being adjustable on the plate to position them in alignment with the chucks and to compensate for varying distances between the slats.

21. In an attachment for coop nailing machines of that type including nail driving chucks, a plate, a bar in spaced relation to the plate work supporting means carried by the bar, nail clincher bars carried by the plate extending between slats of the coop depending from the work supported by said means and in alignment with the chucks, and means for vertically moving said plate to provide for a nail clinching action by the clincher bars.

22. In an attachment for coop nailing machines of that type including nail driving chucks, a supporting plate, a supporting bar in spaced relation to the plate, work supporting means carried by the bar, upstanding nail clincher bars carried by the plate extending between slats of the coop depending from the work supported by said means to align with the chucks, said means interposed between the upper ends of the clincher bars and being adjustable upon said supporting bar, said clincher bars being adjustable on the plate to align with the chucks and to compensate for varying distances between the slats, and means for vertically moving said plate to provide for a nail clinching action by the clincher bars.

23. In an attachment for coop nailing machines, means for supporting the work to be acted upon, adjustable clincher bars arranged below the work supported upon said means and positioned between coop slats depending from the work, nail driving chucks positioned over the work and arranged in alignment with said bars, and means for vertically moving said clincher bars in unison to provide a nail clinching action by the latter.

24. In an attachment for coop nailing machines of that type including nail driving chucks, work supporting means positioned below the chucks and extending between opposed coop slats depending from the supported work to be acted upon, and nail clincher bars positioned between said slats and for action upon the nails driven through the work by the chucks.

25. In an attachment for coop nailing machines of that type including nail driving chucks, work supporting means positioned below the chucks and extending between opposed coop slats depending from the supported work to be acted upon, nail clincher bars positioned between said slats and for action upon the nails driven through the work by the chucks, and means for bodily shifting said bars in unison for clinching the nails.

26. In an attachment for coop nailing machines of that type including nail driving chucks, work supporting means positioned below the chucks and extending between opposed coop slats depending from the supported work to be acted upon, and nail clincher bars positioned between said slats and for action upon the nails driven through the work by the chucks, and the said means interposed between said bars.

27. In an attachment for coop nailing machines of that type including nail driving chucks, work supporting means positioned below the chucks and extending between opposed coop slats depending from the supported work to be acted upon, nail clincher bars positioned between said slats and for action upon the nails driven through the work by the chucks, means for bodily shifting said bars in unison for clinching the nails, and the said work supporting means interposed between said bars.

28. In an attachment for coop nailing machines of that type including nail driving chucks, work supporting means positioned below the chucks and extending between opposed coop slats depending from the supported work to be acted upon, nail clincher bars positioned between said slats and for action upon the nails driven through the work by the chucks, and means for adjusting said bars to compensate for varying distances between said slats to properly align the bars with respect to the nails driven by the chucks.

29. In an attachment for coop nailing machines of that type including nail driving chucks, work supporting means positioned below the chucks and extending between opposed coop slats depending from the supported work to be acted upon, nail clincher bars positioned between said slats and for action upon the nails driven through the work by the chucks, means for bodily shifting said bars in unison for clinching the nails, and means for adjusting said bars to compensate for varying distances between said slats to properly align the bars with respect to the nails driven by the chucks.

30. In an attachment for coop nailing machines of that type including nail driving chucks, work supporting means positioned below the chucks and extending between opposed coop slats depending from the supported work to be acted upon, nail clincher bars positioned between said slats and for action upon the nails driven through the work by the chucks, the said means aligning with said bars, and means for adjusting said bars to compensate for varying distances between said slats to properly align the bars with respect to the nails driven by the chucks.

31. In an attachment for coop nailing machines of that type including nail driving chucks, work supporting means positioned below the chucks and extending between opposed coop slats depending from the supported work to be acted upon, nail clincher bars positioned between said slats and for action upon the nails driven through the work by the chucks, means for bodily shifting said bars in unison for clinching the nails, the said work supporting means interposed between said bars, and means for adjusting said bars to compensate for varying distances between said slats to properly align the bars with respect to the nails driven by the chucks.

32. In an attachment for coop nailing machines of that type including nail driving chucks, work supports extending between coop slats depending from the work mounted upon the supports, and nail clincher bars positioned between said slats.

33. In an attachment for coop nailing machines of that type including nail driving chucks, work supports extending between coop slats extending from the work mounted upon the supports, nail clincher bars positioned between said slats, and means for adjusting said bars to compensate for varying distances between said slats to properly align the bars with respect to the nails driven by the chucks.

34. In an attachment for coop nailing machines of that type including nail driving chucks, a plurality of spaced work holders extending between certain of the slats of one wall of the coop to support the work to be nailed, and a plurality of spaced nail clincher bars extending between the slats of said wall for clinching the nails applied to the work.

35. In an attachment for coop nailing machines, means for supporting the work to be nailed, and nail clinching bars extending between coop slats extended from the work supported by said means and arranged to clinch the nails applied to the work.

36. In an attachment for coop nailing machines, means for supporting the work to be nailed, nail clinching bars extending between coop slats extended from the work supported by said means and arranged to clinch the nails applied to the work, and means for adjusting said bars to compensate for varying distances between said slats to properly align the bars with respect to the nails driven by the chucks.

37. In an attachment for coop nailing machines, the combination of supports for the work to be acted upon and extending between coop slats extended from the work supported thereby, a bodily movable set of nail clincher bars extending between the slats extended from the work to be acted upon and normally spaced from the latter, chucks for driving nails through the work and for holding the latter in a fixed position on the support during the clinching operation by the bars, and means for moving said set of bars towards the work for simultaneously clinching the nails applied to the latter.

38. In an attachment for coop nailing machines, the combination of supports for the work to be acted upon and extending between coop slats extended from the work supported thereby, a bodily movable set of nail clincher bars extending between the slats extended from the work to be acted upon and normally spaced from the latter in a fixed position, chucks for driving nails through the work and for holding the latter on the support during the clinching operation by the bars, means for moving said set of bars towards the work for simultaneously clinching the nails applied to the latter, and means for independently adjusting each of said bars to compensate for varying distances between said slats to properly align the bars with respect to the chucks.

39. In an attachment for coop nailing machines of that type including nail driving chucks, supporting means, nail clincher bars mounted on said means positioned between slats of the coops, said bars being adjustable lengthwise of said means to position them in vertical alignment with respect to the chucks to compensate for varying distances between the slats, and means for moving said supporting means to provide a nail clinching action by said bars.

40. In an attachment for coop nailing machines, a clinching mechanism including a bodily shiftable supporting element carrying a set of clincher bars for nails, and work holding means including work supports disposed at right angles to the path of movement of said element and extending between certain of said bars, said bars being independently adjustable in a direction at right angles to the path of movement of said element, and said work support being independently adjustable in a direction corresponding to the direction in which the bars are adjusted.

41. In an attachment for coop nailing machines, a nail clinching mechanism including a shiftable supporting element carrying a set of clincher bars for nails, said bars being adjustable upon and bodily carried with said element, said mechanism including means for holding said bars in adjusted position, and work holding means including a stationary member carrying adjustable work supports disposed at right angles to and extending between said bars, said work supports being adjustable upon said member and said means including means for maintaining said work supports in adjusted position.

In testimony whereof, I affix my signature hereto.

OSE F. CARPENTER.